United States Patent
Ogo et al.

Patent Number: 6,117,942
Date of Patent: Sep. 12, 2000

[54] SEMIAROMATIC POLYAMIDE RESIN COMPOSITION

[75] Inventors: Yoshimasa Ogo; Yoshikatsu Amimoto, both of Waki-cho, Japan

[73] Assignee: Mitsui Chemicals, Tokyo, Japan

[21] Appl. No.: 09/038,982

[22] Filed: Mar. 12, 1998

[30]     Foreign Application Priority Data

Mar. 13, 1997  [JP]  Japan .................................. 9-059442

[51] Int. Cl.$^7$ .................................................. C08G 63/48
[52] U.S. Cl. ............................................. 525/66; 524/261
[58] Field of Search ............................... 525/66; 524/261

[56]             References Cited

U.S. PATENT DOCUMENTS

| | | | |
|---|---|---|---|
| 5,336,540 | 8/1994 | Kato et al. | 428/36.92 |
| 5,405,904 | 4/1995 | Ikejiri et al. | 524/394 |
| 5,480,937 | 1/1996 | Yoshihara | 525/66 |
| 5,482,998 | 1/1996 | Muehlbach et al. | 525/66 |
| 5,543,452 | 8/1996 | Nakahashi et al. | 524/430 |

FOREIGN PATENT DOCUMENTS

| | | |
|---|---|---|
| 0561631 | 9/1923 | European Pat. Off. . |
| 0397531 | 11/1990 | European Pat. Off. . |
| 0488335 | 6/1992 | European Pat. Off. . |
| 0624923 | 11/1994 | European Pat. Off. . |
| 0693515 | 1/1996 | European Pat. Off. . |
| 62-79260 | 1/1987 | Japan . |
| 62-43456 | 2/1987 | Japan . |
| 63-41554 | 2/1988 | Japan . |

*Primary Examiner*—James J. Seidleck
*Assistant Examiner*—Sanza McClendon

[57]             ABSTRACT

A semiaromatic polyamide resin composition of the present invention contains a polyamide (A) in which a dicarboxylic acid component unit comprises a terephthalic acid component unit and a diamine component unit comprises a straight-chain alkylenediamine component unit and an alkylenediamine component unit having a side-chain alkyl group; and a modified ethylene/α-olefin copolymer (B) obtained by graft-modifying an ethylene/α-olefin copolymer having particular properties with an unsaturated carboxylic acid or a derivative thereof. A molded article obtained by using this composition exhibits excellent anti-creeping property under high-temperature and high-humidity conditions, and causes the metal mold to be little fouled during the molding operation.

10 Claims, 3 Drawing Sheets

FIG.1A

FRONT VIEW

SIDE VIEW

SEMIAROMATIC POLYAMIDE RESIN COMPOSITION

BACKGROUND OF THE INVENTION

1. Field of the Invention

The present invention relates to a semiaromatic polyamide resin composition which causes a metal mold to be less fouled at the time of producing molded articles, exhibits excellent anti-creeping property under high-temperature and high-humidity conditions, and makes it possible to efficiently produce molded articles.

2. Description of the Prior Art

A variety of semiaromatic polyamides having impact resistance have heretofore been proposed. For example, Japanese Laid-Open Patent Publication No. 108855/1992 is disclosing a process for producing a polyamide composition comprising a modified elastic copolymer and a semiaromatic polyamide which is composed of an alkylenediamine unit (b) and a dicarboxylic acid unit (a) that comprises 50 to 100 mol % of a terephthalic acid unit and 0 to 40 mol % of an aromatic dicarboxylic acid other than terephthalic acid or a straight-chain aliphatic dicarboxylic acid unit having 6 to 18 carbon atoms.

It has been known that a composition comprising such a semiaromatic polyamide and a modified elastic polymer exhibits excellent heat resistance and impact resistance (Japanese Laid-Open Patent Publications Nos. 41318/1990 and 98152/1993).

The above-mentioned polyamide exhibits very excellent impact resistance, heat resistance, mechanical properties, chemical properties and physical properties, but causes a white powder to precipitate in the metal mold when the injection molding is repetitively executed by using a metal mold. When used for the electronic devices, furthermore, the polyamide exhibits insufficient anti-creeping property under high temperature and high humidity conditions, and it has been desired to improve this property.

The present inventors have analyzed the powder and have found the fact that the powder contains residual monomers, oligomer components and decomposed products of polymers. The unreacted monomers, low-order oligomers and decomposed products of polymers bring about problems such as impairing the appearance, deteriorating dimensional precision, etc. when the electronic parts are to be molded and, particularly, when small parts such as connectors are to be molded. Moreover, the white powder that precipitates in the metal mold causes vent holes of the metal mold to be clogged. Therefore, the molding operation must be interrupted to clean the metal mold.

It has therefore been desired to provide a semiaromatic polyamide resin composition which exhibits excellent mechanical strength such as rigidity, impact resistance, bending strength, and exhibits excellent chemical and physical properties such as anti-creeping property, impact resistance and heat resistance, causes the metal mold to be less fouled during the molding operation, causes no clogging in the vent holes of the metal mold, and makes it possible to obtain precision molded articles exhibiting excellent appearance.

SUMMARY OF THE INVENTION

It is an object of the present invention to provide a semiaromatic polyamide resin composition which causes the metal mold to be less fouled during the molding operation, and makes it possible to obtain molded articles having excellent properties such as anti-creeping property under high-temperature and high-humidity conditions.

According to the present invention, there is provided a semiaromatic polyamide resin composition comprising:

(A) 99 to 60% by weight of a polyamide copolymer having a melting point of from 280 to 330° C. formed of, as a main constituent component unit, a recurring unit of a dicarboxylic acid component unit and a diamine component unit, at least not smaller than 45 mol % of said dicarboxylic acid unit being a terephthalic acid component unit, and said diamine component unit comprising 55 to 99 mol % of a straight-chain alkylenediamine component unit having 4 to 18 carbon atoms and 1 to 45 mol % of an alkylenediamine component unit having a side-chain alkyl group and 4 to 18 carbon atoms; and (B) 1 to 40% by weight of a modified ethylene/α-olefin copolymer having an amount of graft modification of from 0.01 to 5% by weight, obtained by graft-modifying a copolymer of an ethylene and an α-olefin having 3 to 20 carbon atoms, and having:
  (i) a density over a range of from 0.89 to 0.95 g/cm$^3$,
  (ii) a temperature (melting point; Tm) at a maximum peak position on an endothermic curve of from 90 to 127° C. as measured by using a differential scanning calorimeter (DSC), and
  (iii) a crystallinity of from 20% to 60% as measured by the X-ray diffraction method, with an unsaturated carboxylic acid or a derivative thereof.

DETAILED DESCRIPTION OF THE INVENTION

The feature of the present invention resides in the combination of the above-mentioned particular semiaromatic polyamide (A) among the semiaromatic polyamides, and the above-mentioned particular modified ethylene/α-olefin copolymer among the modified ethylene/α-olefin copolymers. This makes it possible to decrease the amount of precipitation of the oligomer during the molding operation, to suppress the clogging in the vent holes in the metal mold, and to carry out the molding operation for extended periods of time. Furthermore, the semiaromatic polyamide resin composition of the present invention exhibits excellent fluidity and offers an advantage in that it can be molded at a low temperature. Moreover, the semiaromatic polyamide resin composition of the present invention exhibits excellent anti-creeping property, resistance against aging by heat, and resistance against deformation by heat under high-temperature and high-humidity conditions. Supressing a drop in the tenacity enables the aromatic polyamide to exhibit its other inherent excellent properties, such as high mechanical strength and low water absorption.

[Polyamide (A)]

The polyamide (A) used for the resin composition of the present invention is constituted by a recurring unit which is a main constituent component unit of a particular dicarboxylic acid component unit [a] and a particular aliphatic diamine component unit [b].

When it is presumed that the total dicarboxylic acid component units are existing in an amount of 100 mol % in the polyamide that is used in the present invention, then, the polyamide contains a terephthalic acid component unit (a-1) in an amount of from 45 to 100 mol %, preferably, from 50 to 90 mol % and, more preferably, from 60 to 80 mol %. Furthermore, the polyamide contains an aromatic dicarboxylic acid component unit (a-2) other than terephthalic acid in an amount of from 0 to 55 mol %, preferably, from 0 to 40 mol % and, more preferably, from 0 to 30 mol %. Moreover, the polyamide contains an aliphatic dicarboxylic acid component unit (a-3) in an amount of from 0 to 55 mol %. The moldability is improved as the polyamide contains the aliphatic dicarboxylic acid component unit (a-3) in a small amount or, concretely, in an amount of from 10 to 50 mol % and, more preferably, from 20 to 40 mol %. When the content of the aliphatic dicarboxylic acid component unit exceeds 55 mol %, the content of the terephthalic acid component unit inevitably becomes smaller than 45 mol %. Such a polyamide absorbs water in an increased amount and exhibits a melting point which is lower than 280° C. Therefore, a molded article obtained by using this polyamide undergoes a relatively larger change in size as it absorbs water and exhibits insufficient heat resistance.

The diamine component unit [b] that forms the recurring unit together with the dicarboxylic acid component unit, comprises a straight-chain aliphatic alkylenediamine component unit having 4 to 18 carbon atoms, and an alkylenediamine component unit having a side-chain alkyl group and 4 to 18 carbon atoms.

The polyamide used in the present invention contains the straight-chain aliphatic alkylenediamine component unit (b-1) having 4 to 18 carbon atoms in an amount of from 55 to 99 mol %, preferably, from 70 to 98 mol %, more preferably, from 80 to 95 mol % and, particularly preferably, from 85 to 93 mol % per 100 mol % of the whole diamine component units present in the polyamide. The polyamide further contains the alkylenediamine component unit (b-2) having a side-chain alkyl group and 4 to 18 carbon atoms in an amount of from 1 to 45 mol %, preferably, from 2 to 30 mol %, more preferably, from 5 to 20 mol %, and particularly preferably, from 7 to 15 mol %. Upon containing the two kinds of particular alkylenediamine component units in the above-mentioned amounts, the melting point of the polyamide which is the main component in the composition of the present invention is lowered to such a degree that does not cause the molded article (or the molten polyamide) to be burned with a gas during the injection molding. Besides, the white powder precipitates little in the metal mold, and the polyamide exhibits Tg which is not lower than 80° C., exhibits excellent anti-creeping property under high-temperature and high-humidity conditions, and exhibits an increased rate of crystallization.

That is, the white powder tends to precipitate during the injection molding when the content of the straight-chain alkylenediamine component unit (b-1) having 4 to 18 carbon atoms exceeds 99 mol %. When the content of the alkylenediamine component unit (b-2) having a side-chain alkyl group and 4 to 18 carbon atoms exceeds 45 mol %, the rate of crystallization of the polyamide becomes slow and the heat resistance becomes insufficient.

The polyamide recurring unit comprising the dicarboxylic acid component unit and the diamine component unit, is expressed by the following formula. The recurring unit forming the polyamide has the terephthalic acid component unit (a-1) as the dicarboxylic acid component unit [a] which is an essential component unit. The recurring unit having this terephthalic acid component unit (a-1) is expressed by the formula [I-a],

[I-a]

wherein $R^1$ is an alkylene group having 4 to 18 carbonatoms, which may have a side chain.

The dicarboxylic acid component unit [a] needs not entirely be the component unit expressed by the above-mentioned formula [I-a] but in which part of the terephthalic acid component unit (a-1) may be substituted by other dicarboxylic acid components.

Other carboxylic acid component units than the terephthalic acid component include an aromatic dicarboxylic acid component unit (a-2) other than the terephthalic acid and an aliphatic dicarboxylic acid component unit (a-3).

Examples of the aromatic dicarboxylic acid component unit (a-2) other than the terephthalic acid include an isophthalic acid component unit, a 2-methylterephthalic acid component unit, and a naphthalenedicarboxylic acid component unit. An isophthalic acid component unit is particularly preferred as a component unit derived from an aromatic dicarboxylic acid other than the terephthalic acid.

Among the aromatic dicarboxylic acid component units (a-2) other than the terephthalic acid, the recurring unit having a particularly preferred isophthalic acid component unit of the present invention is expressed by the following formula [1-b],

[1-b]

wherein $R^1$ is an alkylene group having 4 to 18 carbon atoms, which may have a side chain.

The aliphatic dicarboxylic acid component unit (a-3) is derived from an aliphatic dicarboxylic acid having an alkylene group and 4 to 20 carbon atoms and, preferably, 6 to 12 carbon atoms. Examples of the aliphatic dicarboxylic acid include succinic acid, adipic acid, azelaic acid and sebacic acid. An adipic acid component unit and a sebacic acid component unit are particularly preferred as aliphatic dicarboxylic acid components.

The recurring unit having the aliphatic dicarboxylic acid component unit (a-3), which is the other dicarboxylic acid component unit constituting the dicarboxylic acid component unit [a], is expressed by the following formula [II],

[II]

wherein R¹ is an alkylene group having 4 to 18 carbon atoms, which may have a side chain, and n is an integer which is usually from 2 to 18 and, preferably, from 4 to 10.

The diamine component unit [b] forming the polyamide used in the present invention comprises the straight-chain alkylenediamine component unit (b-1) having 4 to 18 carbon atoms, and the alkylenediamine component unit (b-2) having a side-chain alkyl group and 4 to 18 carbon atoms.

Concrete examples of the straight-chain alkylenediamine component unit (b-1) include 1,4-diaminobutane, 1,6-diaminohexane, 1,7-diaminoheptane, 1,8-diaminooctane, 1,9-diaminononane, 1,10-diaminodecane, 1,11-diaminoundecane and 1,12-diaminododecane. Among them, it is desired to use component units derived from 1,6-diaminohexane, 1,8-diaminooctane, 1,10-diaminodecane and 1,12-diaminododecane. The polyamide of the present invention may contain plural kinds of these component units. Among them, furthermore, it is particularly desired to use a component unit derived from the 1,6-diaminohexane.

Concrete examples of the alkylenediamine component unit (b-2) having a side-chain alkyl group and 4 to 18 carbon atoms include component units derived from 1-butyl-1,2-diamino-ethane, 1,1-dimethyl-1,4-diamino-butane, 1-ethyl-1,4-diamino-butane, 1,2-dimethyl-1,4-diamino-butane, 1,3-dimethyl-1,4-diamino-butane, 1,4-dimethyl-1,4-diamino-butane, 2,3-dimethyl-1,4-diamino-butane, 2-methyl-1,5-diamino-pentane, 2,5-dimethyl-1,6-diamino-hexane, 2,4-dimethyl-1,6-diamino-hexane, 3,3-dimethyl-1,6-diamino-hexane, 2,2-dimethyl-1,6-diamino-hexane, 2,2,4-trimethyl-1,6-diamino-hexane, 2,4,4-trimethyl-1,6-diamino-hexane, 2,4-diethyl-1,6-diamino-hexane, 2,3-dimethyl-1,7-diamino-heptane, 2,4-dimethyl-1,7-diamino-heptane, 2,5-dimethyl-1,7-diamino-heptane, 2,2-dimethyl-1,7-diamino-heptane, 2-methyl-4-ethyl-1,7-diamino-heptane, 2-ethyl-4-methyl-1,7-diamino-heptane, 2,2,5,5-tetramethyl-1,7-diamino-heptane, 3-isopropyl-1,7-diamino-heptane, 3-isooctyl-1,7-diamino-heptane, 1,3-dimethyl-1,8-diamino-octane, 1,4-dimethyl-1,8-diamino-octane, 2,4-dimethyl-1,8-diamino-octane, 3,4-dimethyl-1,8-diamino-octane, 4,5-dimethyl-1,8-diamino-octane, 2,2-dimethyl-1,8-diamino-octane, 3,3-dimethyl-1,8-diamino-octane, 4,4-dimethyl-1,8-diamino-octane, 3,3,5-trimethyl-1,8-diamino-octane, 2,4-diethyl-1,8-diamino-octane and 5-methyl-1,9-diamino-nonane.

In the present invention, the number of carbon atoms of the alkylenediamine component unit having a side-chain alkyl group represents the total number of carbon atoms of a main-chain alkylene group and of carbon atoms of a side-chain alkyl group, unless otherwise stated.

Among the alkylenediamine component units having the side-chain alkyl group as described above, it is desired to use a component unit derived from a side-chain alkyldiamine having 1 to 2 side-chain alkyl groups which have 1 to 2 carbon atoms and having a main chain which has 4 to 10 carbon atoms, and, particularly, to use a 2-methyl-1,5-diaminopentane component unit.

A recurring unit having a component unit derived from the 2-methyl-1,5-diaminopentane which is a side-chain alkyldiamine that is particularly preferably used in the present invention, is expressed by the following formula [III], wherein R² is a divalent hydrocarbon group such as p-phenylene group, m-phenylene group or alkylene group under a condition in which 45 to 100 mol % is the p-phenylene group.

The polyamide that can be used in the present invention may contain, as dicarboxylic acid component units, a terephthalic acid component unit which is the above-mentioned main component unit, a component unit derived from a divalent aromatic carboxylic acid other than terephthalic acid as represented by an isophthalic acid component unit, and the above-mentioned aliphatic dicarboxylic acid component unit, as well as a small amount of a component unit derived from a tri-basic or more-basic polyhydric carboxylic acid such as trimellitic acid or pyromellitic acid. The polyamide contains the component units derived from such a polyhydric carboxylic acid, usually, in an amount of from 0 to 5 mol %.

The polyamide used in the present invention has an intrinsic viscosity [η] of usually from 0.5 to 3.0 dl/g, preferably, from 0.5 to 2.8 dl/g and, particularly preferably, from 0.6 to 2.5 dl/g as measured in a concentrated sulfuric acid at a temperature of 30° C.

The polyamide used in the present invention exhibits a melting point higher than that of the aliphatic polyamide that has heretofore been used. In many cases, however, the melting point does not exceed 310° C. That is, the polyamide used in the present invention has a melting point which usually lies from 280 to 305° C. and, in many cases, lies from 290 to 305° C. Moreover, the polyamide used in the present invention has a particularly excellent heat resistance, a low water absorption, and permits the molded articles to be little crystallized through annealing. Furthermore, the amorphous part of the polyamide used in the present invention has a glass transition temperature of usually not lower than 80° C. and, preferably, from 90 to 150° C.

The polyamide used in the present invention can be prepared by the polycondensation of a dicarboxylic acid component and a diamine component. Concretely speaking, the polyamide is prepared by blending an aqueous medium with terephthalic acid, aromatic dicarboxylic acid other than terephthalic acid or aliphatic dicarboxylic acid and straight-chain dialkylenediamine and alkylenediamine having a side-chain alkyl group in amounts mentioned above, followed by heating under the application of a pressure in the presence of a catalyst such as sodium hypophosphite to, first, prepare a polyamide precursor, and, then, melting and kneading the polyamide precursor. In preparing the polyamide precursor, a molecular weight-adjusting agent such as benzoic acid may be blended.

The polyamide used in the present invention can be further prepared by separately preparing a polyamide containing an unit derived from an alkylene diamine component having a side-chain alkyl group and a polyamide without an unit derived from an alkylene diamine component having a side-chain, and melting and kneading them together to effect the amide-exchanging reaction.

Furthermore, the polyamide used in the present invention can be prepared by adjusting the blending amounts of at least two kinds of polyamides having different compositions so that the dicarboxylic acid component unit and the diamine component unit lie within the above-mentioned ranges, and melting and kneading them together.

Typical examples of the polyamides (A) used in this invention include the following polyamides (A-1) and (A-2).

polyamide (A-1) (to be referred to as "linear polyamide"):
the dicarboxylic acid component unit is composed of 45 to 100 mole % of a terephthalic acid component unit, 0 to 55 mole % of an aromatic dicarboxylic acid component unit other than terephthalic acid, and/or 0 to 55 mole % of an aliphatic dicarboxylic acid component unit having 4 to 20 carbon atoms, and the diamine component unit is composed of 100 mole % of a straight chain alkylene diamine component unit containing 4 to 18 carbon atoms.

polyamide (A-2) (to be referred to as "branched polyamides"):
the dicarboxylic acid component unit is composed of 45 to 100 mole % of a terephthalic acid component unit, 0 to 55 mole % of an aromatic dicarboxylic acid component unit other than terephthalic acid, and/or 0 to 55 mole % of an aliphatic dicarboxylic acid component unit containing 4 to 20 carbon atoms, and the diamine component unit is composed of 5 to 95 mole % of a straight chain alkylene diamine component unit having 4 to 18 carbon atoms and 5 to 95 mole % of an alkylene diamine component containing 4 to 18 carbon atoms and containing a side-chain alkyl group.

The linear polyamide (A-1) and the branched polyamide (A-2) may be combined by melt kneading, etc.

Examples of the linear polyamide (A-1) may include the following.

(A-1-1): Polyamides composed of structural component units of formulae [I-a] and [II]. $R^1$ group in the formulae [I-a] and [II] represents a straight chain alkylene group (C number: 4 to 18).

In this case, the amount of the [I-a] unit should be at least 45 mole %, preferably 45 to 70 mole %, most preferably 45 to 60 mole %, and the amount of the [II] unit should be 55 mole % or below, preferably 55 to 30 mole %, most preferably 55 to 40 mole %.

(A-1-2): Polyamides composed of structural component units of formulae [I-a], [I-b] and [II]. $R^1$ group in the formulae [I-a], [I-b] and [II] represents a straight chain alkylene group (C number: 4 to 18).

In this case, the amount of the [I-a] unit should be 50 to 80 mole %, preferably 60 to 70 mole %, the amount of the [I-b] unit should be 10 to 40 mole %, preferably 20 to 30 mole %, and the amount of the [II] unit should be 30 to 5 mole %, preferably 20 to 10 mole %.

Examples of the branched polyamides (A-2) may include the following.

(A-2-1): Polyamides composed of constituent component units of the formulae [I-a] and [III]. The $R^1$ groups in the formula [I-a] represents a straight chain alkylene group (C number: 4 to 18), and the $R^2$ group in the formula [III] is a p-phenylene group.

In this case, the amount of the [I-a] unit should be 5 to 95 mole %, preferably 30 to 70 mole %, most preferably 40 to 60 mole %, and the amount of the [III] unit should be 95 to 5 mole %, preferably 70 to 30 mole %, most preferably 60 to 40 mole %.

(A-2-2): Polyamides composed of constituent component units of the formulae [I-a], [I-b] and [III]. The $R^1$ group in the formulae [I-a] and [I-b] represents a straight chain alkylene group (C number: 4 to 18), and the $R^2$ group in the formula [III] is a p-phenylene group.

In this case, the amount of the [I-a] unit should be 25 to 65 mole %, preferably 30 to 50 mole %, and the amount of the [I-b] unit should be 5 to 30 mole %, preferably 10 to 20 mole %, and the amount of the [III] unit should be 30 to 70 mole %, preferably 40 to 60 mole %.

When the polyamide (A) is used by combining the linear polyamide (A-1) with the branched polyamide (A-2), it is preferred to use at least 45 parts by weight, especially 50 to 95 parts by weight, of the linear polyamide (A-1), and at least 5 parts by weight, especially 5 to 50 parts by weight, of the branched polyamide (A-2). Among these, when the polyamide (A) is prepared from the linear polyamide (A-1-1) and the branched polyamide (A-2-1), it is preferred to use (A-1-1) in an amount of 45 to 95% by weight, preferably 60 to 90% by weight, most preferably 70 to 85% by weight, and use (A-2-1) in an amount of 55 to 5% by weight, preferably 40 to 10% by weight, most preferably 30 to 15% by weight.

Within these ranges, there can be obtained a polyamide having excellent anti-creeping property and forming less white powder in injection molding.

[Modified ethylene/α-olefin copolymer (B)]

The modified ethylene/α-olefin copolymer (B) used in the present invention is obtained graft-modifying an ethylene/α-olefin copolymer [B1] with an unsaturated carboxylic acid or a derivative thereof.

The ethylene/α-olefin copolymer [B1] before being graft-modified comprises an ethylene and an α-olefin having 3 to 20 carbon atoms.

The ethylene content in the ethylene/α-olefin copolymer [B1] is not smaller than 70 mol % and, preferably, from 80 to 98 mol %.

Concrete examples of the α-olefin include propylene, 1-butene, 1-pentene, 1-hexene, 4-methyl-1-pentene, 1-octene and 1-decene. Among them, 1-butene, 1-hexene, 4-methyl-1-pentene and 1-octene are preferably used. These α-olefines may be used in a single kind or in a combination of two or more kinds.

The ethylene/α-olefin copolymer [B1] has a density of from 0.89 to 0.95 g/cm$^3$, preferably, from 0.90 to 0.94 g/cm$^3$ and, particularly preferably, from 0.91 to 0.93 g/cm$^3$. Within these ranges, there can be obtained a composition having excellent anti-creeping property and forming less white powder in injection molding.

Moreover, the ethylene/α-olefin copolymer [B1] has a temperature (melting point; Tm) at a maximum peak position on an endothermic curve of from 90 to 127° C. and, preferably, from 95 to 120° C. as measured by using a differential scanning calorimeter (DSC).

The ethylene/α-olefin copolymer [B1] has a crystallinity of from 20 to 60%, preferably, from 25 to 55% and, more preferably, from 30 to 50% as measured by the X-ray diffraction method.

Moreover, the ethylene/α-olefin copolymer [B1] has a melt flow rate (MFR; ASTM D 1238, 190° C., load of 2.16 kg) of, generally, from 0.01 to 100 g/10 min., preferably, from 0.1 to 50 g/10 min., and, more preferably, from 0.2 to 20 g/10 min.

The ethylene/α-olefin copolymer [B1] having the above-mentioned properties can be prepared by a widely known method by using a catalyst of the type of titanium (Ti), vanadium (V) or zirconium (Zr).

The modified ethylene/α-olefin copolymer (B) used in the present invention has a grafted amount of unsaturated carboxylic acid or of a derivative thereof over a range of from 0.01 to 5% by weight and, preferably, from 0.1 to 3% by weight per 100% by weight of the modified ethylene/α-olefin copolymer (B).

Concrete examples of the unsaturated carboxylic acid to be grafted onto the ethylene/α-olefin copolymer [B1] include acrylic acid, methacrylic acid, maleic acid, fumaric acid and itaconic acid. Examples of the derivative of the unsaturated carboxylic acid include acid anhydrides, esters, amides, imides and metal salts. Concrete examples include anhydrous maleic acid, anhydrous itaconic acid, anhydrous citraconic acid, methyl acrylate, methyl methacrylate, ethyl acrylate, ethyl methacrylate, glycidyl acrylate, monoethyl maleate, diethyl maleate, monomethyl fumarate, dimethyl fumarate, monomethyl itaconate, diethyl itaconate, acrylamide, methacrylamide, monoamide maleate, diamide maleate, N-monoethylamide maleate, N,N-diethylamide maleate, N-monobutylamide maleate, N,N-dibutylamide maleate, monoamide fumarate, diamide fumarate, N-monobutylamide fumarate, N,N-dibutylamide fumarate, maleimide, N-butylmaleimide, N-phenylmaleimide, sodium acrylate, sodium methacrylate, potassium acrylate and potassium methacrylate. Among these grafted monomers, it is most desired to use the anhydrous maleic acid.

The ethylene/α-olefin copolymer [B1] can be graft-modified by various conventional methods by using the graft monomer (unsaturated carboxylic acid or a derivative thereof).

Examples include a melt modification method in which the ethylene/α-olefin copolymer [B1] is melted by using an extruder, and a graft monomer is added thereto to effect the graft-copolymerization, and a solution modification method in which the ethylene/α-olefin copolymer [B1] is dissolved in a solvent, and a graft monomer is added thereto to effect the graft-copolymerization. In either case, it is desired to start the reaction in the presence of a radical initiator, so that the graft monomer is efficiently graft-copolymerized.

As the radical initiator, there can be preferably used an organic peroxide and an organic perester. Concrete examples include organic peroxides such as benzoyl peroxide, dichlorobenzoyl peroxide, dicumyl peroxide, di-tert-butyl peroxide, 2,5-dimethyl-2,5-di(peroxide benzoate) hexyne-3, 1,4-bis(tert-butylperoxyisopropyl) benzene and lauroyl peroxide; organic peresters such as tert-butyl peracetate, 2,5-dimethyl-2,5-di(tert-butylperoxy) hexyne-3, 2,5-dimethyl-2,5-di(tert-butylperoxy) hexane, tert-butyl perbenzoate, tert-butylperphenyl acetate, tert-butyl perisobutylate, tert-butylper-sec-octoate, tert-butyl perpivalate, cumyl perpivalate and tert-butylperdiethyl acetate; and azo compounds such as azoisobutylonitrile and dimethylazoisobutylate. Among them, it is desired to use dialkyl peroxides such as dicumyl peroxide, di-tert-butyl peroxide, 2,5-dimethyl-2,5-di(peroxybenzoate) hexyne-3, 2,5-dimethyl-2,5-di(tert-butylperoxy) hexyane and 1,4-bis(tert-butylperoxyisopropyl) benzene.

The above-mentioned radical initiator is used, usually, in an amount of from 0.001 to 1 part by weight per 100 parts by weight of the ethylene/α-olefin copolymer [B1].

Other monomer such as styrene may be made present during the grafting reaction.

[Polyamide resin composition]

The polyamide resin composition of the present invention can be blended with an organic flame retardant such as bromonated polystyrene prepared from a brominated styrene monomer and having, as a main constituent component, a structural unit of the following formula [IV],

[IV]

wherein m is a number of not smaller than 1 but not larger than 5,
brominated product of polyethylene ether or brominated product of polystyrene.

The brominated polystyrene contains a bibrominated styrene unit in an amount of, preferably, not smaller than 60% by weight and, particularly preferably, not smaller than 70% by weight. The brominated polystyrene may be obtained by copolymerizing a monobrominated styrene and/or a tribrominated styrene in an amount of not larger than 40% by weight and, preferably, not larger than 30% by weight.

The organic flame retardant is added in an amount of from 0 to 60 parts by weight, preferably, from 1 to 20 parts by weight and, particularly preferably, from 2 to 15 parts by weight per 100 parts by weight of the semiaromatic polyamide resin. When the amount of addition is smaller than 0.5 parts by weight, the flame-retarding effect is not sufficient. When the amount of addition is larger than 60 parts by weight, mechanical properties and thermal properties decrease, which is not desirable. In order to obtain the flame-retarding effect sufficiently, the amount of the organic flame retardant is preferably from 40 to 60 parts by weight.

In addition to the above-mentioned organic flame retardant, the semiaromatic polyamide resin composition of the present invention may use at least one kind of flame-retarding assistant selected from antimony oxide, sodium antimonate, tin oxide, iron oxide, zinc oxide and zinc nitrate. Among them, it is preferred to use the sodium antimonate and, particularly, a substantially anhydrous sodium antimonate heat-treated at a temperature of not lower than 550° C.

The flame-retarding assistant is added in an amount of from 0 to 10 parts by weight and, preferably, from 2 to 8 parts by weight.

As required, furthermore, the semiaromatic polyamide resin composition of the present invention may be blended with heat-resistant resins such as PPS (polyphenylene sulfide), PPE (polyphenyl ether), PES (polyether sulfone), PEI (polyether imide), LCP (liquid crystal polymer), and modified products of these resins. Among them, the polyphenylene sulfide is particularly preferred.

The semiaromatic polyamide resin composition of the present invention is blended with the above-mentioned heat-resistant resin in an amount of, usually, smaller than 50% by weight and, preferably, from 0 to 40% by weight.

The semiaromatic polyamide resin composition of the present invention may be further blended with an antioxidant (heat-resistant stabilizer) such as phosphorus-type antioxidant, phenol-type antioxidant, amine-type antioxidant or sulfur-type antioxidant.

Examples of the phosphorus-type antioxidant include 9,10-dihydro-9-oxa-10-phosphaphenanthrene-10-oxide, triphenyl phosphite, 2-ethylhexyl phosphate, dilauryl phosphite, tri-iso-octyl phosphite, tris(2,4-di-tertbutylphenyl) phosphite, trilauryl phosphite, trilauryl-di-thiophosphite, trilauryl-tri-thiophosphite, trisnonylphenyl phosphite, distearylpentaerythritol diphosphite, tris(monononylphenyl) phosphite, tris(dinonylphenyl)

phosphite, trioctadecyl phosphite, 1,1,3-tris(2-methyl-di-tridecyl phosphite-5-tert-butylphenyl) butane, 4,4'-butylidene-bis(3-methyl-6-tert-butyl) tridecyl phosphite, 4,4'-butylidene-bis(3-methyl-6-tert-butyl-di-tridecyl) phosphite, bis(2,4-di-tert-butylphenyl) pentaerythritol-diphosphite, bis(2,6-di-tert-butyl-4-methylphenyl) pentaerythritol-diphosphite, tetrakis(2,4-di-tert-butylphenyl)-4,4'-bisphenylene diphosphite, distearylpentaerythritol diphosphite, tridecyl phosphite, tristearyl phosphite, 2,2'-methylenebis(4,6-di-tert-butylphenyl) octyl phosphite, sorbitol-tris-phosphite-distearyl-mono-$C_{30}$-diol ester and bis(2,4,6-tri-tert-butylphenyl) pentaerythritol diphosphite. Among them, it is desired to use phosphor-type antioxidant of pentaerythritol-diphosphite, such as bis(2,4-di-tert-butylphenyl) pentaerythritol-diphosphite and bis(2,6-di-tert-butyl-4-methylphenyl) pentaerythritol-diphosphite, as well as tetrakis(2,4-di-tert-butylphenyl)-4,4'-bisphenylene diphosphite.

Examples of the phenol-type antioxidant include 3,9-bis{2-[3-(3-tert-butyl-4-hydroxy-5-methylphenyl) propionyl]-1,1-dimethylethyl}-2,4,8,10-tetraoxaspiro[5,5] undecane, 2,6-di-tert-butyl-p-cresol, 2,4,6-tri-tert-butylphenol, n-octadecyl-3-(4'-hydroxy-3',5'-di-tert-butylphenyl) propionate, styrenated phenol, 4-hydroxy-methyl-2,6-di-tert-butylphenol, 2,5-di-tert-butyl-hyroquinone, cyclohexylphenol, butylhydroxyanisole, 2,2'-methylene-bis-(4-methyl-6-tert-butylphenol), 2,2'-methylene-bis-(4-ethyl-6-tert-butylphenol), 4,4'-isopropylidene bisphenol, 4,4'-butylidene-bis(3-methyl-6-tert-butylphenol), 1,1-bis(4-hydroxyphenyl) cyclohexane, 4,4'-methylene-bis(2,6-di-tert-butylphenol), 2,6-bis(2'-hydroxy-3'-tert-butyl-5'-methylbenzyl) 4-methyl-phenol, 1,1,3-tris(2-methyl-4-hydroxy-5-tert-butylphenyl) butane, 1,3,5-tris-methyl-2,4,6-tris(3,5-di-tert-butyl-4-hydroxybenzyl) benzene, tetrakis[methylene-3-(3,5-di-tert-butyl-4-hydroxyphenyl) propionate] methane, tris(3,5-di-tert-butyl-4-hydroxyphenyl) isocyanulate, tris[β-(3,5-di-tert-butyl-4-hydroxyphenyl) propionyl-oxyethyl] isocyanate, 4,4'-thiobis(3-methyl-6-tert-butylphenol), 2,2'-thiobis(4-methyl-6-tert-butylphenol), 4,4'-thiobis(2-methyl-6-tert-butylphenol) and N,N'-hexamethylenebis(3,5-di-tert-butylphenol-4-hydroxycinnamamide).

Furthermore, examples of the amine-type antioxidant include 4,4'-bis (α, α-dimethylbenzyl) diphenylamine, phenyl-α-naphthylamine, phenyl-β-naphthylamine, N,N'-diphenyl-p-phenylenediamine, N,N'-di-β-naphthyl-p-phenylenediamine, N-cyclohexyl-N'-phenyl-p-phenylenediamine, N-phenyl-N'-isopropyl-p-phenylenediamine, aldol-α-naphthylamine, a polymer of 2,2,4-trimethyl-1,2-dihydroquinone, and 6-ethoxy-2,2,4-trimethyl-1,2-dihydroquinoline.

Examples of the sulfur-type antioxidant include thiobis (β-naphthol), thiobis(N-phenyl-β-naphthylamine), 2-mercaptobenzothiazole, 2-mercaptobenzimidazole, dodecylmercaptane, tetramethylthiuram monosulfide, tetramethylthiuram disulfide, nickeldibutyl dithiocarbamate, nickelisopropyl xanthate, dilaurylthio dipropionate and distearylthio dipropionate.

These antioxidants can be used in a single kind or in combination. Among these antioxidants, it is particularly preferred to use a phosphorus-type antioxidant in a single kind or in combination with other antioxidant.

The antioxidant is used in an amount of from 0.05 to 2 parts by weight per 100 parts by weight of the resin component. Preferably, the antioxidant is used in an amount of from 0.1 to 1.5 parts by weight and, particularly, from 0.2 to 1.0 part by weight.

The semiaromatic polyamide resin composition of the present invention can be blended with various inorganic fillers in the form of a fiber, a powder, particles, a plate, needles, a cloth or a mat as inorganic reinforcing agents.

Preferred examples of the fibrous inorganic filler include a glass fiber, a carbon fiber, an asbestos fiber and a boron fiber. Among them, the glass fiber is preferred. Use of the glass fiber makes it possible to improve moldability, as well as to improve mechanical properties such as tensile strength, bending strength and flexural modulus of elasticity of the molded article containing the inorganic reinforcing agent and to improve heat resistance such as thermal deformation temperature. The glass fiber has an average length of, usually, from 0.1 to 20 mm and, preferably, from 0.3 to 6 mm, and an aspect ratio of, usually, from 10 to 2000 and, preferably, from 30 to 600. It is desired to use the glass fiber having an average length and an aspect ratio lying within the above-mentioned ranges. The glass fiber is blended in an amount of, usually, not larger than 200 parts by weight, preferably, from 5 to 180 parts by weight and, more preferably, from 5 to 150 parts by weight per 100 parts by weight of the resin component.

In addition to the above-mentioned fibrous inorganic fillers, examples of the fillers in the form of a powder, particles, a plate, needles, a cloth or a mat include powdery or plate-like inorganic compounds such as silica, silica alumina, alumina, calcium carbonate, titanium dioxide, talc, wollastonite, diatomaceous earth, clay, kaolin, ball-like glass, mica, gypsum, red iron oxide, magnesium oxide and zinc oxide, as well as needle-like inorganic compounds such as potassium titanate.

These fillers may be used in two or more kinds being mixed together. Or, these fillers may be used being treated with a silane coupling agent or a titanium coupling agent.

These fillers have an average particle diameter of, usually, from 0.1 to 200 μm and, preferably, from 1 to 100 μm.

The fillers are used in an amount of, usually, not larger than 200 parts by weight, preferably, not larger than 100 parts by weight and, particularly preferably, from 1 to 50 parts by weight per 100 parts by weight of the resin component.

Furthermore, the semiaromatic polyamide resin composition of the present invention may be blended with additives such as organic filler, heat stabilizer, aging stabilizer, antistatic agent, anti-slipping agent, anti-blocking agent, defogger, lubricating agent, pigment, dyestuff, natural oil, synthetic oil, wax, etc., in addition to the above-mentioned components in amounts with which they will not impair the properties of the semiaromatic polyamide resin composition.

Examples of the organic filler include totally aromatic polyamide such as polyparaphenylene terephthalamide, polymetaphenylene terephthalamide, polyparaphenylene isophthalamide, polymetaphenylene isophthalamide, a condensation product of diaminodiphenyl ether and terephthalic acid (isophthalic acid), and a condensation product of para (meta) aminobenzoic acid; totally aromatic polyamideimide such as a condensation product of diaminodiphenyl ether and anhydrous trimellitic acid or anhydrous pyromellitic acid; totally aromatic polyester; totally aromatic polyimide; heterocycle-containing compounds such as polybenzimidazole and polyimidazophenanthroline; and secondarily processed articles made of polytetrafluoroethylene or the like in the form of a powder, a plate, a fiber or a cloth.

By using the thus prepared semiaromatic polyamide resin composition, a molded article of a desired shape can be produced relying upon an ordinary melt-molding method such as compression molding method, injection molding method or extrusion molding method.

For example, the semiaromatic polyamide resin composition of the present invention is thrown into an injection-molding machine of which the cylinder temperature is adjusted to be about 350 to 300° C., melted and is introduced into a metal mold of a desired shape to obtain a molded article.

There is no particular limitation on the shape of the molded article produced by using the semiaromatic polyamide resin composition of the present invention. There can be obtained molded articles of various shapes such as electrically driven tools, general industrial parts, machine parts such as gears and cams, and electronic parts such as printed wiring boards, housings of electronic parts, etc. The semiaromatic polyamide resin composition of the invention can be preferably used particularly for forming parts mounted on the interior and on the exterior of automobiles, for forming parts used inside the engine room, and for forming electric parts for automobiles.

Furthermore, the semiaromatic polyamide resin composition of the present invention is useful as a resin for producing connectors for connecting electronic circuits together. That is, the connectors produced by using the above-mentioned polyamide resin composition exhibits excellent heat resistance and deforms little by the application of stress under high-temperature and high-humidity conditions.

EXAMPLES

The invention will now be described in detail by way of Examples to which the invention is in no way limited as far as it does not depart from the gist thereof. In these Examples, the melting points and the degree of crystallization of the polymer used were measured, and the properties of the resulting resin compositions were evaluated by the following methods.

Melting point:

An endothermic curve of DSC was sought, and the temperature at a maximum peak position was designated as the melting point (Tm). The endothermic curve was sought by filling a sample in an aluminum pan, abruptly heating the pan to 200° C., holding the pan at 200° C. for 5 minutes, thereafter decreasing the temperature to room temperature at a rate of 20° C./minute, and then elevating the temperature at a rate of 10° C./minute.

Degree of crystallization:

Using the sample, a press-sheet having a thickness of 1 mm was prepared, and the degree of crystallization was measured at 23° C. by X-ray diffraction method.

1. Mechanical strength.

① Flexural modulus of elasticity (FM).

Measured in compliance with the method of ASTM D-790.

② Izod impact strength (IZ).

Measured in compliance with the method of ASTM D-256 (with notch).

2. Flexural anti-creeping property.

Measured in compliance with the method of JIS K 7116. The testing atmosphere was under the conditions of a temperature of 40° C. and a relative humidity of 93% stipulated under JIS C 0022, and the property was evaluated in terms of the amount of deformation after 7 days.

Figure 2:
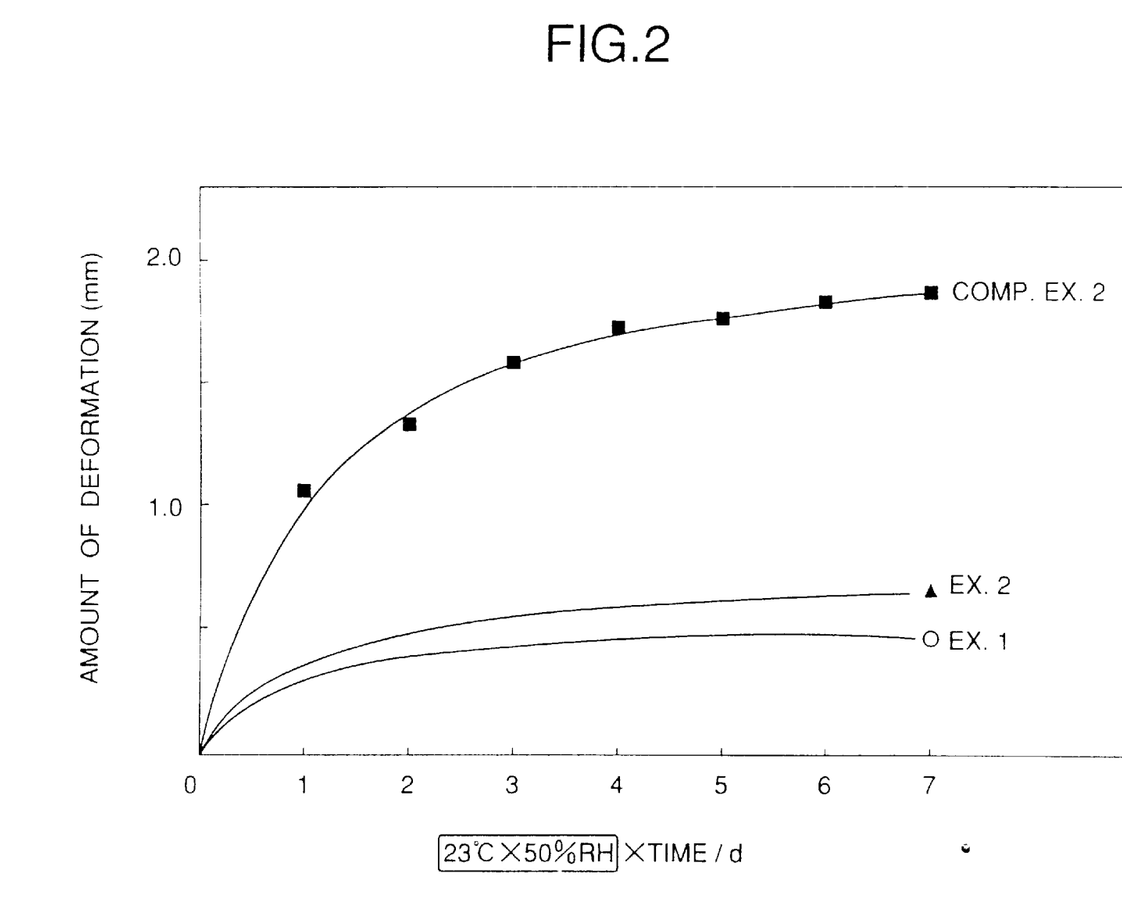
FIG. 2 is a graph illustrating relationships between the passage of time (days) and the amount of creeping deformation (mm) in Examples and Comparative Examples in an atmosphere of 23° C. and 50% RH.
Figure 3:
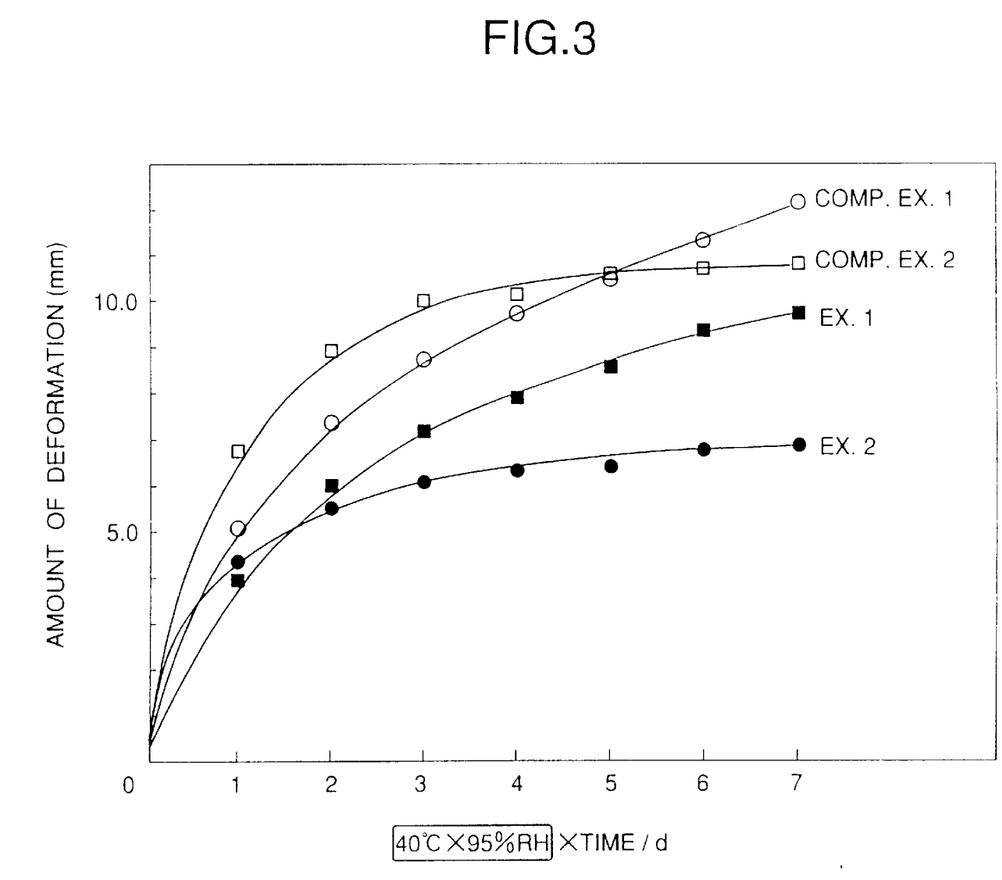
FIG. 3 is a graph illustrating a relationships between the passage of time (days) and the amount of creeping deformation (mm) in Examples and Comparative Examples in an atmosphere of 40° C. and 95% RH.

FIGS. 2 and 3 illustrate relationships between the passage of time (days) and the amount of creeping deformation (mm) of test pieces obtained in Examples and in Comparative Examples as measured in an atmosphere under the conditions of 23° C. and 50% RH, and 40° C. and 95% RH.

3. Evaluation of clogging in the metal mold.

Figure 1A:
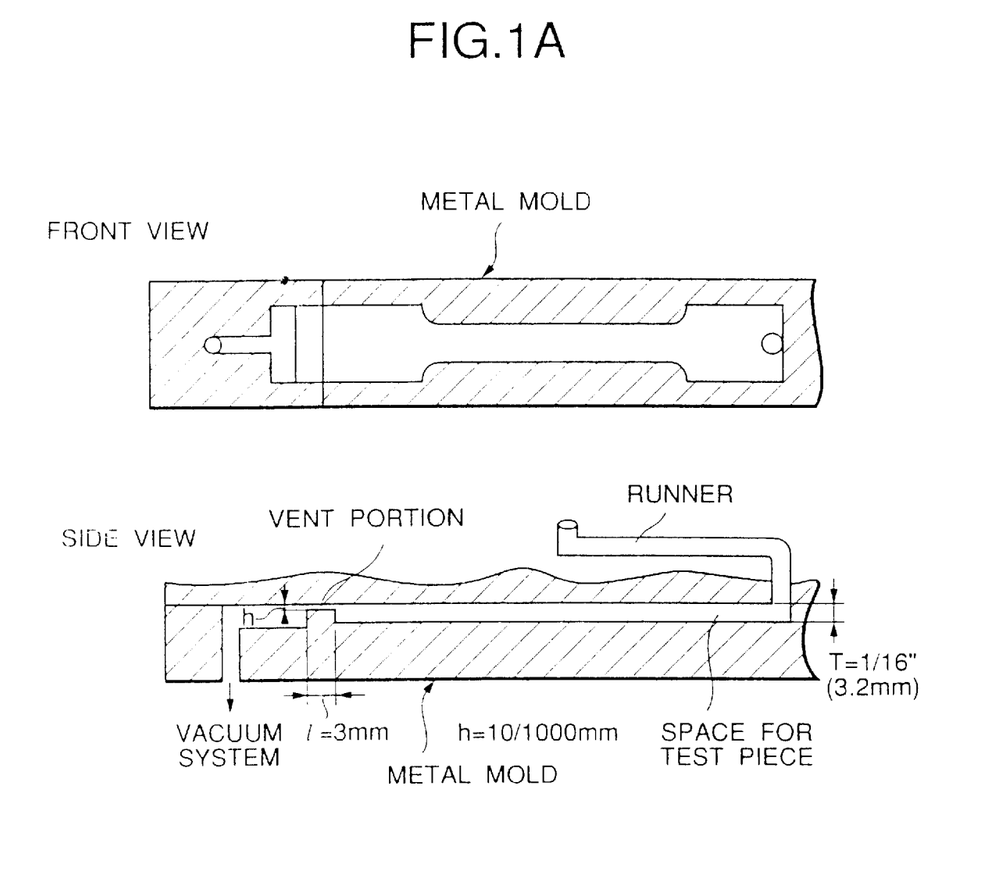
FIG. 1A is a sectional view of a metal mold used for evaluating the clogging of the metal mold according to examples.

(1) A gas vent (air vent) of a depth of 10 $\mu$m and a width of 3 mm was formed in an end portion of a metal mold for preparing a test piece as shown in FIG. 1A, and the injection-molding was effected under the molding conditions mentioned below.

(2) Molding conditions.

a. Molding machine: SG50-MIII manufactured by Sumitomo Heavy Machinery Industries Co.

b. Molding conditions:

Cylinder temperature: 330° C.

Metal mold temperature: 120° C.

Injection speed: 60 mm/sec.

(3) Evaluation of gas vent logging:

When the polyamide containing large amounts of component such as unreacted monomers, low-order oligomers or decomposed products of polymers, is repetitively molded, the component deposits in the vent which is then clogged.

When the vent is clogged, the air in the metal mold is little released. In the finally charged port of cavity, therefore, gas is adiabatically compressed and the gas is heated at a high temperature.

Figure 1B:
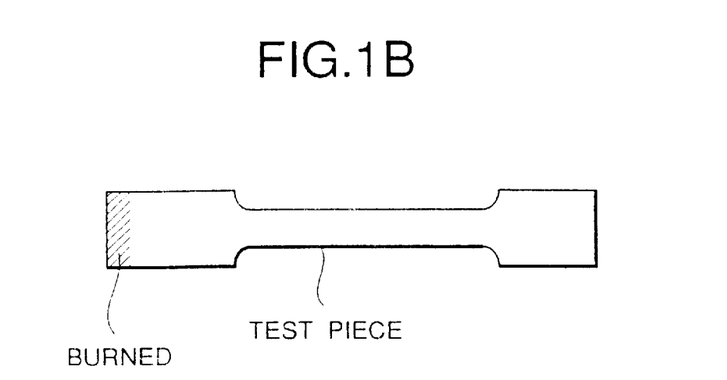
FIG. 1B is a diagram illustrating a test piece that is burned by a gas in the test for evaluating the clogging of the metal mold.

As the gas is heated at a high temperature, the resin contacted by the gas is carbonized and blackened, resulting in the occurrence of "burning by gas". Therefore, the end of the test piece is blackened as shown in FIG. 1B. Clogging in the m old was evaluated by observing the test piece.

4. Heat distortion temperature (HDT).

Measured in compliance with the method of ASTM D 648.

Reference Example 1

139.3 Grams (1.20 mols) of a 1,6-diaminohexane, 139.3 g (1.20 mols) of a 2-methyl-1,5-diaminopentane, 365.5 g (2.2 mols) of terephthalic acid, 0.55 g ($5.2 \times 10^{-3}$ mols) of sodium hypophosphite as a catalyst, and 64 ml of ion-exchanged water were fed into a 1-liter reactor, purged with nitrogen, and were reacted under the conditions of 250° C. and 35 kg/cm$^2$ for one hour. The molar ratio of the 1,6-diaminohexane and the 2-methyl-1,5-diaminopentane was 50:50.

After one hour has passed, the reaction product formed in the reaction vessel was extracted into a receiving vessel which was coupled to the reaction vessel and in which the pressure was set to be lower by about 10 kg/cm$^2$ to obtain 561 g of a polyamide precursor having a intrinsic viscosity [$\eta$] of 0.15 dl/g.

Then, the polyamide precursor was dried and was melt-polymerized by using a twin screw extruder at a cylinder temperature of 330° C. to obtain an aromatic polyamide (PA-1). The aromatic polyamide possessed the following composition.

The content of the 1,6-diaminohexane component unit was 50 mol % and the content of the 2-methyl-1,5-diaminopentane component unit was 50 mol % in the diamine component unit.

Reference Example 2

269.3 Grams (2.32 mols) of the 1,6-diaminohexane, 205.6 g (1.24 mols) of terephthalic acid, 148.0 g (1.01 mols) of adipic acid, 0.48 g ($4.50 \times 10^{-3}$ mols) of sodium hypophosphite as a catalyst, 3.43 g ($2.81 \times 10^{-2}$ mols) of benzoic acid as a molecular weight-adjusting agent, and 62 ml of ion-exchanged water were fed into the 1-liter reactor, purged with nitrogen, and were reacted under the conditions of 250° C. and 35 kg/cm$^2$ for one hour. The molar ratio of the terephthalic acid and the adipic acid was 55:45.

After one hour has passed, the reaction product formed in the reaction vessel was extracted into the receiving vessel which was coupled to the reaction vessel and in which the pressure was set to be lower by about 10 kg/cm$^2$ to obtain 559 g of a polyamide precursor having a intrinsic viscosity [η] of 0.15 dl/g.

Then, the polyamide precursor was dried and was melt-polymerized by using the twin screw extruder at a cylinder temperature of 330° C. to obtain an aromatic polyamide (PA-2). The aromatic polyamide possessed the following composition.

The content of the terephthalic acid component unit was 55 mol % and the content of the adipic acid component unit was 45 mol % in the dicarboxylic acid component unit.

Example 1

The polyamide (PA-1) having a intrinsic viscosity [η] of 1.05 dl/g prepared in Reference Example 1 and the polyamide (PA-2) having a intrinsic viscosity [η] of 1.00 dl/g prepared in Reference Example 2, were dried, blended together at a weight ratio of 25:75, and were melt-extruded by using the twin screw extruder at a cylinder temperature of 330° C. to obtain a semiaromatic polyamide resin having a methyl group on a side chain.

The semiaromatic polyamide resin possessed the following composition. The content of the 1,6-diaminohexane component unit was 88 mol % and the content of the 2-methyl-1,5-diaminopentane component unit was 12 mol % in the diamine component unit.

The content of the terephthalic acid component unit was 66 mol % and the content of the adipic acid component unit was 34 mol % in the dicarboxylic acid component unit.

[Preparation of a modified ethylene/1-butene copolymer]

100 Parts by weight of an ethylene/1-butene copolymer (PE-1) [density=0.920 g/cm$^3$, melting point (Tm)=124° C., crystallinity=48%, MFR (ASTM D 1238, 190° C., load of 2.16 kg)=1.0 g/10 min., ethylene content=96 mol %] prepared by using a Ti-type catalyst, 0.8 parts by weight of maleic anhydride, and 0.07 parts by weight of a peroxide [trade name: Perhexyne 25B, manufactured by Nippon Yushi Co.]

were mixed together by using the Henschel's mixer, and the obtained mixture was melt-graft-modified by using a single screw extruder of a diameter of 65 mm maintained at 230° C. in order to obtain a modified ethylene/1-butene copolymer (MAH-PE-1)].

The IR analysis of the modified ethylene/1-butene copolymer (MAH-PE-1) indicated that the grafted amount of the maleic anhydride was 0.8% by weight. The MFR (ASTM D 1238, 190° C., load of 2.16 kg) was 0.27 g/10 min., and the melting point was 122° C.

[Preparation of a resin composition]

20 Parts by weight of the modified ethylene/1-butene copolymer (MAH-PE-1) obtained as described above, 80 parts by weight of the semiaromatic polyamide obtained according to the above-mentioned method, and 2 parts by weight of talc were mixed together at a ratio as shown in Table 1, and were melted and mixed together by using a vented twin screw extruder having a diameter of 30 mm at a cylinder temperature of from 300 to 335° C.

By using the thus obtained pellets, an injection-molded test piece was prepared and was evaluated for its properties.

The results of evaluation were as shown in Table 1.

Example 2

246.0 Grams (2.116 mols) of the 1,6-diaminohexane, 34.4 g (0.302 mols) of the 2-methyl-1,5-diaminopentane, 249.4 g (1.50 mols) of terephthalic acid, 113,5 g (0.77 mols) of adipic acid, 0.45 g (4.25×10$^{-3}$ mols) of sodium hypophosphite as a catalyst, and 65 ml of ion-exchanged water were fed into the 1-liter reactor, purged with nitrogen, and were reacted under the conditions of 250° C. and 35 kg/cm$^2$ for one hour. After one hour has passed, the reaction product formed in the reaction vessel was extracted into the receiving vessel which was coupled to the reaction vessel and in which the pressure was set to be lower by about 10 kg/cm$^2$ to obtain 554 g of a polyamide precursor having a intrinsic viscosity [η] of 0.15 dl/g.

Then, the polyamide precursor was dried and was melt-polymerized by using the biaxial extruder at a cylinder temperature of 330° C. to obtain an aromatic polyamide (PA-3). The aromatic polyamide possessed the following composition.

The content of the 1,6-diaminohexane component unit was 88 mol % and the content of the 2-methyl-1,5-diaminopentane component unit was 12 mol % in the diamine component unit. The content of the terephthalic acid component unit was 66 mol % and the content of the adipic acid component unit was 34 mol % in the dicarboxylic acid component unit.

The procedure was carried out in the same manner as in Example 1 with the exception of using the thus obtained polyamide (PA-3). The results were as shown in Table 1.

Comparative Example 1

The procedure was carried out in the same manner as in Example 1 with the exception of using, as a semiaromatic polyamide resin, the aromatic polyamide (PA-1) only, that was prepared in Reference Example 1. The results were as shown in Table 1.

Comparative Example 2

The procedure was carried out in the same manner as in Example 1 with the exception of using, as a semiaromatic polyamide resin, the semiaromatic polyamide (PA-2) only, that was prepared in Reference Example 2. The results were as shown in Table 1.

Comparative Example 3

[Preparation of a modified ethylene/1-butene copolymerized elastomer]

100 Parts by weight of an ethylene/1-butene copolymer [density=0.88 g/cm$^3$, MFR (ASTM D 1238, 190° C., load of 2.16 kg)=3.6 g/10 min, ethylene content=90 mol %, melting point (Tm)=72° C., crystallinity=16%] prepared by using a V-type catalyst, 0.5 parts by weight of maleic anhydride and 0.045 parts by weight of a peroxide [trade name: Perhexyne 25B manufactured by Nippon Yushi Co.]

were mixed together by using the Henschel's mixer, and the obtained mixture was melt-graft-modified by using a single screw extruder of a diameter of 65 mm maintained at 230° C. to obtain a modified ethylene/1-butene copolymer (MAH-PE-2).

The IR analysis of the modified ethylene/1-butene copolymer (MAH-PE-2) indicated that the grafted amount of the maleic anhydride was 0.5% by weight. The MFR (ASTM D 1238, 190° C., load of 2.16 kg) was 2.1 g/10 min., and the melting point was 71° C.

The procedure was carried out in the same manner as in Example 1 with the exception of using the MAH-PE-2. The results were as shown in Table 1.

Example 3

The polyamide precursor having a intrinsic viscosity [η] of 1.05 dl/g prepared in Reference Example 1 and the polyamide having a limiting viscosity [η] of 1.00 dl/g prepared in Reference Example 2, were dried, blended together at a weight ratio of 37.5:62.5, and were melt-extruded by using the biaxial extruder at a cylinder temperature of 330° C. to obtain a semiaromatic polyamide resin having a methyl group on a side chain.

The semiaromatic polyamide resin possessed the following composition. The content of the 1,6-diaminohexane component unit was 81 mol % and the content of the 2-methyl-1,5-diaminopentane component unit was 19 mol % in the diamine component unit.

The content of the terephthalic acid component unit was 72 mol % and the content of the adipic acid component unit was 28 mol % in the dicarboxylic acid component unit.
[Preparation of a resin composition]

20 Parts by weight of the modified ethylene/1-butene copolymer (MAH-PE-1) used in the Example 1, 80 parts by weight of the semiaromatic polyamide resin obtained according to the above-mentioned method, and 1 part by weight of talc were mixed together at a ratio as shown in Table 1, and were melted and mixed together by using a vented twin screw extruder having a diameter of 30 mm at a cylinder temperature of from 300 to 335° C.

By using the thus obtained pellets, an injection-molded test piece was prepared and was evaluated for its properties.

The results of evaluation were as shown in Table 1.

Comparative Example 4

The procedure was carried out in the same manner as in Example 1 but without being blended with MAH-PE-1. The results were as shown in Table 1.

The semiaromatic polyamide resin composition of the present invention exhibits excellent flowability and can be molded at a low temperature.

Moreover, the resin composition of the present invention permits oligomer to be less precipitated during the molding, causes the vent holes in the metal mold to be less clogged, and is suited for performing the molding operation for extended periods of time. Furthermore, the resin composition of the present invention exhibits excellent resistance against aging by heating and resistance against deformation by heat.

By utilizing such properties, the semiaromatic polyamide resin composition of the present invention can be suitably used as a thermoplastic resin for producing electrically driven tools, general industrial parts, machine parts, electronic parts, parts mounted on the interior and on the exterior of automobiles, parts mounted inside the engine room, and electric parts for automobiles.

By using the semiaromatic polyamide resin composition of the present invention, it is made possible to produce the above-mentioned molded articles having favorable tenacity. By suppressing a drop in the toughness, furthermore, the aromatic polyamide also exhibits its other excellent inherent properties such as mechanical strength and low water absorption.

What is claimed is:

1. A semiaromatic polyamide resin composition comprising:
   (A) 99 to 60% by weight of a polyamide having a melting point of from 280 to 330° C. formed of, as a main constituent component unit, a recurring unit of a dicarboxylic acid component unit and a diamine component unit, at least not smaller than 45 mol % of said dicarboxylic acid unit being a terephthalic acid component unit, and said diamine component unit comprising 55 to 99 mol % of a straight-chain alkylenediamine component unit having 4 to 18 carbon atoms and 1 to 45 mol % of an alkylenediamine component unit having a side-chain alkyl group and 4 to 18 carbon atoms; and
   (B) 1 to 40% by weight of a modified ethylene/α-olefin copolymer having an amount of graft modification of from 0.01 to 5% by weight, obtained by graft-modifying a copolymer of an ethylene and an α-olefin having 3 to 20 carbon atoms, and having:
      (i) a density over a range of from 0.89 to 0.95 g/cm$^3$,
      (ii) a temperature (melting point; Tm) at a maximum peak position on an endothermic curve of from 90 to 127° C. as measured by using a differential scanning calorimeter (DSC), and
      (iii) a crystallinity of from 20% to 60% as measured by the X-ray diffraction method,
with an unsaturated carboxylic acid or a derivative thereof.

2. A resin composition according to claim 1, wherein not more than 55 mol % of said dicarboxylic acid component

TABLE 1

|  | PA-1 (parts by wt.) | PA-2 (parts by wt.) | PA-3 three-way system (parts by weight) | MAH PE-1 | MAH PE-2 | Talc | FM (MPα) | IZ (J/m) | HDT (° C.) | Vent clogged | Creep-deformed |
|---|---|---|---|---|---|---|---|---|---|---|---|
| Example 1 | 20 | 60 |  | 20 |  | 2 | 2100 | 180 | 110 | ○ | ○ |
| Example 2 |  |  | 80 | 20 |  | 2 | 2100 | 250 | 110 | ○ | ○ |
| Example 3 | 30 | 50 |  | 20 |  | 2 | 2000 | 200 | 115 | ○ | Δ |
| Comp. Ex. 1 | 80 |  |  | 20 |  | 2 | 2000 | 400 | 125 | ○ | × |
| Comp. Ex. 2 |  | 80 |  | 20 |  | 2 | 2000 | 150 | 90 | × | × |
| Comp. Ex. 3 | 20 | 60 |  |  | 20 | 2 | 1700 | 600 | 105 | Δ | Δ |
| Comp. Ex. 4 | 25 | 75 |  |  |  |  | 3000 | 50 | 130 | Δ | ○ |

*Evaluated in terms of shot number until clogged (number of times) ○: >8000 Δ: 4000~8000 ×: <4000
**Evaluated in terms of amount of deformation ○: ≦0.8 Δ: 0.8~1.6 ×: >1.6 unit comprises an aromatic dicarboxylic acid component unit other than terephthalic acid and/or an aliphatic dicarboxylic acid component unit having 4 to 20 carbon atoms.

3. A resin composition according to claim 1, wherein the straight-chain alkylenediamine component unit having 4 to 18 carbon atoms is a 1,6-diaminohexane component unit.

4. A resin composition according to claim 1, wherein the alkylenediamine component unit having a side-chain alkyl group and 4 to 18 carbon atoms is a 2-methyl-1,5-diaminopentane component unit.

5. A resin composition according to claim 1, wherein the polyamide (A) is obtained (a) by polycondensing a dicarboxylic acid component with a diamine component containing an alkylenediamine component having a side-chain alkyl group and 4 to 18 carbon atoms, (b) by polycondensing a side chain-containing polyamide precursor with another polyamide precursor, the side chain containing polyamide precursor being obtained by the polycondensation of a dicarboxylic acid component with a diamine component containing an alkylenediamine component having a side-chain alkyl group and 4 to 18 carbon atoms, or (c) by the amide-exchanging reaction of a side chain-containing polyamide with another polyamide, the side chain-containing polyamide being obtained by the polycondensation of a dicarboxylic acid component with a diamine component containing an alkylenediamine component which has a side-chain alkyl group and 4 to 18 carbon atoms.

6. A resin composition according to claim 5, wherein said polyamide (A) is a composition comprising:
(1) 5 to 50 parts by weight of a side chain-containing polyamide in which a dicarboxylic acid component unit comprises 45 to 100 mol % of a terephthalic acid component unit, and 0 to 55 mol % of an aromatic dicarboxylic acid component unit other than terephthalic acid and/or 0 to 55 mol % of an aliphatic dicarboxylic acid component unit having 4 to 20 carbon atoms, and in which a diamine component unit comprises 5 to 95 mol % of a straight-chain alkylenediamine component unit having 4 to 18 carbon atoms, and 5 to 95 mol % of an alkylene diamine component unit having a side-chain alkyl group and 4 to 18 carbon atoms; and (2) 50 to 95 parts by weight of an aromatic polyamide in which the dicarboxylic acid component unit comprises 45 to 100 mol % of the terephthalic acid component unit, 0 to 55 mol % of the aromatic dicarboxylic acid component unit other than terephthalic acid and/or 0 to 55 mol % of the aliphatic dicarboxylic acid component unit having 4 to 20 carbon atoms, and in which the diamine component comprises 100 mol % of the straight-chain alkylenediamine component unit having 4 to 18 carbon atoms.

7. A resin composition according to claim 6, wherein the straight-chain alkylenediamine component unit having 4 to 18 carbon atoms is a 1,6-diaminohexane component unit.

8. A resin composition according to claim 6, wherein the alkylenediamine component unit having the side-chain alkyl group and 4 to 18 carbon atoms is a 2-methyl-1,5-diaminopentane component unit.

9. A resin composition according to claim 1, wherein the semiaromatic polyamide resin composition contains 1 to 200 parts by weight of an inorganic filler per 100 parts by weight of the resin component.

10. A resin composition according to claim 9, wherein the inorganic filler is a talc.

* * * * *